United States Patent

Honda et al.

[15] 3,654,605

[45] Apr. 4, 1972

[54] REMOTE METER READING SYSTEM HAVING ELECTRO-MECHANICAL OSCILLATORS

[72] Inventors: Yukio Honda; Tsukasa Kawamura, both of Tokyo, Japan

[73] Assignees: Tamura Electric Works, Limited, Tokyo, Japan; Yukio Honda, Tokyo, Japan, part interest to each

[22] Filed: Mar. 2, 1970

[21] Appl. No.: 15,501

[30] Foreign Application Priority Data

Mar. 3, 1969 Japan....................................44/15499

[52] U.S. Cl................................340/151, 340/150, 340/152

[51] Int. Cl...........................................................H04q 9/00

[58] Field of Search.................................340/150, 151, 152

[56] References Cited

UNITED STATES PATENTS

| | | | |
|---|---|---|---|
| 2,910,579 | 10/1959 | Jones et al. | 340/152 T R |
| 3,036,295 | 5/1962 | Kleist | 340/152 T R |
| 3,266,018 | 8/1966 | Higgins | 340/151 |
| 3,519,994 | 7/1970 | Morton | 340/150 |

*Primary Examiner*—Harold I. Pitts
*Attorney*—Chittick, Pfund, Birch, Samuels & Gauthier

[57] ABSTRACT

In a remote reading system to read values displayed in a remote local office in a central office, the local office is provided with a digit wheel, a plurality of permanent magnets arranged on one side of the digit wheel in accordance with predetermined decimal — binary codes and a plurality of passive oscillators closely adjacent the digit wheel, a predetermined number of the passive oscillators being assigned to one bit of the codes whereas the central office is provided with a single oscillator of variable frequency or a plurality of oscillators of different frequencies assigned to the passive oscillators, a plurality of filter receivers responsive to oscillation frequencies of the passive oscillators, a binary-decimal converter for the outputs from the filter receivers, means to display the output from the converter, and a modulator. Each of the passive oscillators operates to resonate to a frequency assigned thereto and sent from the central office when the passive oscillator comes to face one of the permanent magnets and the different oscillation frequencies are applied from the central office simultaneously to the passive oscillators in the local office through the modulator which connects the passive oscillators with the filter receivers to read in the central office the digits in the digit wheel.

5 Claims, 9 Drawing Figures

YUKIO HONDA
TSUKASA KAWAMURA INVENTORS

BY Chittick, Pfund, Birch, Samuels & Gauthier
ATTORNEY

FIG. 3
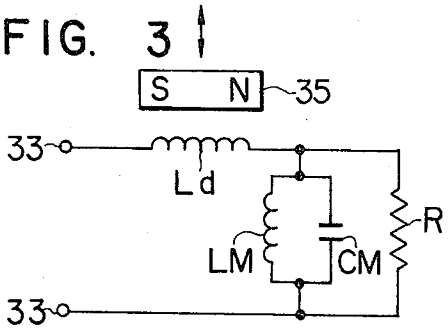
FIG. 4
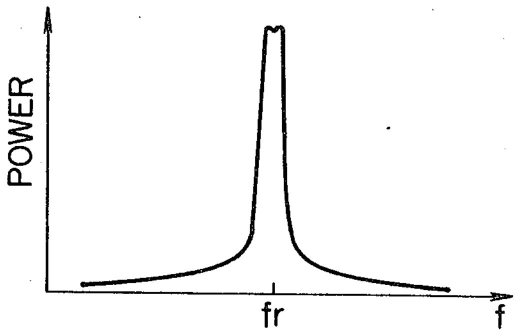
FIG. 5
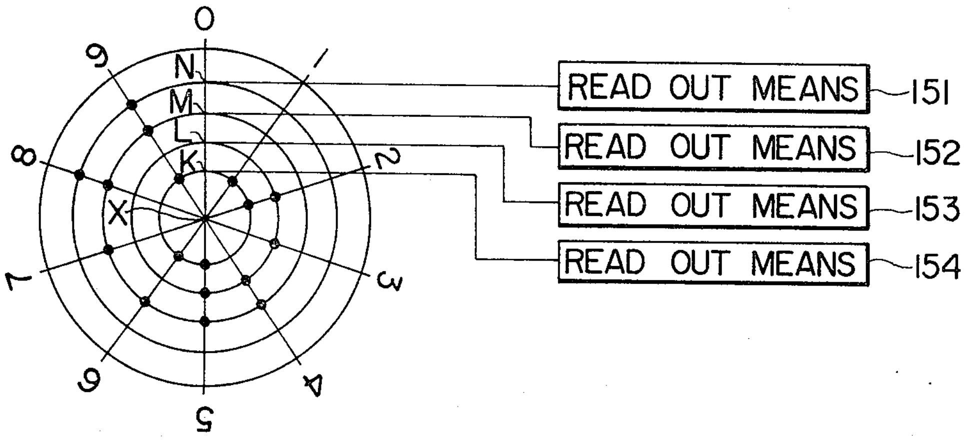
FIG. 6
| DECIMAL | BINARY CODES | | | |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 0 | 1 | 1 | 1 |
| 6 | 0 | 1 | 0 | 1 |
| 7 | 0 | 1 | 0 | 0 |
| 8 | 1 | 1 | 0 | 0 |
| 9 | 1 | 1 | 0 | 1 |
| CIRCLES | N | M | L | K |
YUKIO HONDA
TSUKASA KAWAMURA INVENTORS
BY Chittick, Pfund, Birch, Samuels & Gauthier
ATTORNEY

YUKIO HONDA
TSUKASA KAWAMURA
INVENTORS

BY Chittick, Pfund, Birch, Samuels & Gauthier
ATTORNEY

REMOTE METER READING SYSTEM HAVING ELECTRO-MECHANICAL OSCILLATORS

BACKGROUND OF THE INVENTION

This invention relates to a remote reading system to read at a central office conditions of remote local offices and more particularly to a novel system of reading indications of meters in local offices by sending a commanding signal from the central office.

Such a remote reading system should be highly reliable in operation and economical in construction. Thus for example, where indicated values of digit wheels of digital counters of electric, gas or aqueduct meters are to be read at the central office it is necessary to construct them such that the read out means actuated by a command signal sent from the central office should not contact the digit wheels, that the read out means have long operating life and be formed of passive elements and that there is no source of power located in local offices to send information to the central office. While various types of remote reading systems have been proposed in the past any one of them could not satisfly all of the requirements described above.

SUMMARY OF THE INVENTION

It is therefore an object of this invention to provide a novel remote reading system wherein read out means in the remote local office is comprised by passive means which do not contact the digit wheel and there is no source of power provided in the local office.

In accordance with one embodiment of this invention the local office is equipped with a digit wheel, a plurality of permanent magnets arranged on one side of the digit wheel to correspond to the digits on the digit wheel to be displayed in accrodance with predetermined decimal-binary codes and a plurality of passive oscillators located closely adjacent one side of the digit wheel, a predetermined number of the passive oscillators being assigned to one bit of the codes. Whereas the central office is equipped with a single oscillator of variable frequency or a plurality of oscillators oscillating at different frequencies assigned to the passive oscillators, a plurality of filter receivers responsive to oscillation frequencies of the passive oscillators, a binary-decimal converter for the outputs from the filter receivers, means to display the output from the converter, and a modulator. Each of the passive oscillators operates to resonate to a frequency assigned thereto and sent from the central office when the passive oscillator comes to face one of the permanent magnets and the different oscillation frequencies are applied from the central office simultaneously to the passive oscillators in the local office through the modulator. The modulator connects the passive oscillators with the filter receivers to read in the central office the digits on the digit wheel.

BRIEF DESCRIPTION OF THE DRAWING

The invention together with further objects and advantages thereof can be more fully understood from the following detailed description taken in conjunction with the accompanying drawing in which:

FIG. 3 is a diagram to explain the relationship between the electro-mechanical converter and a permanent magnet;

FIG. 4 shows a resonance characteristic of the electro-mechanical converter in the state shown in FIG. 3;

FIG. 5 is a diagram to show the relationship between the permanent magnets mounted on a digit wheel to be read and the converter;

FIG. 6 shows a conversion table showing decimal digits and reflected binary codes.

DESCRIPTION OF THE PREFERRED EMBODIMENTS

In the following description of the embodiments of this invention, for the sake of description, it is assumed that the counters in local offices have only one order of magnitude, in other words, there is provided only one digit wheel. Generally, a digit wheel has 10 digits to be displayed, e.g., from 0 to 9 inclusive. According to this invention, means is provided to convert these decimal digits into binary codes. Thus, read out means to read 10 different digits of a digit wheel includes four discrete means, for one bit of the code.

Figures 1, 2A:
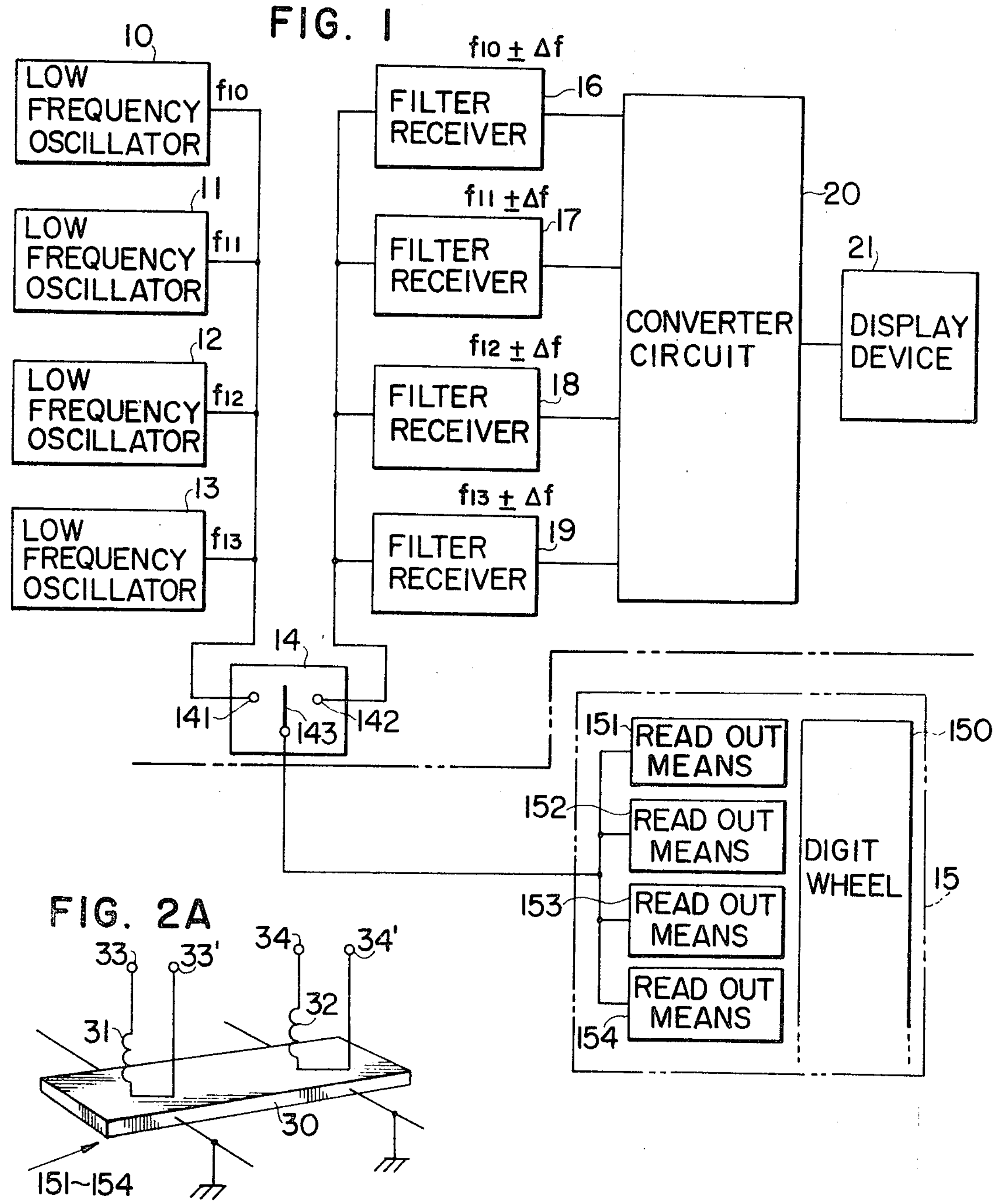
FIG. 1 is a block diagram of one embodiment of this invention.
FIG. 2A is a perspective view of an electro-mechanical converter employed in this invention.

In the embodiment shown in FIG. 1, the central office is provided with four low frequency oscillators 10 through 13 providing four fixed frequencies $f_{10}$, $f_{11}$, $f_{12}$ and $f_{13}$, a chopper 14 connected to receive these output frequencies, four discrete filter receivers 16 through 19 connected to the chopper 14, a binary-decimal converter circuit 20 connected to receive outputs from these filter receivers and a display device 21 connected to the converter circuit 20. The pass frequency bands of filter receivers 16 through 19 range from $f_{10} \pm \Delta f$ to $f_{13} \pm \Delta f$. Each remote local office is provided with a counter connected to the chopper 14. As described above, in this embodiment the counter 15 has one order of magnitude and comprises a digit wheel 150 and four read out means 151 through 154 positioned close to and confronting the digit wheel 150 as will be described later in more detail. Read out means 151 is driven by the output frequency $f_{10}$ from the oscillator 10 via chopper 14 in a manner to be described hereunder. Similarly, read out means 152, 153 and 154 are driven by output frequencies $f_{11}$, $f_{12}$ and $f_{13}$. As described later, outputs from these read out means 151 through 154 convert each digit of the digit wheel into a binary code comprising four bits. Before describing the operation of the system shown in FIG. 1, construction of read out means 151 through 154 of the local office will be first described.

Each of the read out means 151 through 154 employed in this invention comprises an electro-mechanical converter, for example, a magnetostrictive oscillator which associates with a tuning fork or tuning reed. FIG. 2A shows one example of an electro-magnetic or magnetostrictive oscillator suitable for use in this invention comprising a vibrating plate (tuning reed) 30, a coil (magnetostrictive converting element) 31 secured to one end thereof and an electro-magnetic pick-up element, or an electro-magnetic coil 32 confronting the other end of the vibrating plate 30. Terminals 33 and 33' are input terminals whereas terminals 34 and 34' are output terminals.

Figure 2B:
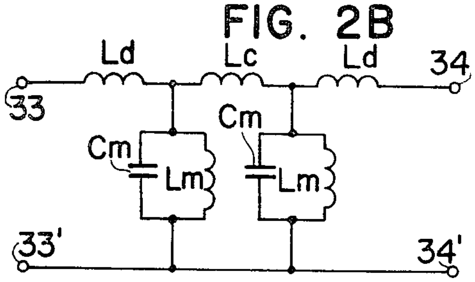
FIG. 2B is an equivalent circuit of the electro-mechanical converter.

FIG. 2B shows an equivalent circuit of the electro-mechanical converter which is represented by a series and parallel resonance circuit consisting of inductors Ld, Lc and Lm, a capacitor Cm, and a resistor R. Thus, a frequency that minimizes or maximizes the impedance of the parallel circuit and maximizes or minimizes the circuit current provides a resonance condition. Further, it is noted that the resonance state of a mechanical vibrating element, in comparing with that of an electric vibrating element, shows a much larger value of Q and shows a more stable condition which is not influenced by external environment as temperature and the like. In a four terminal circuit network utilizing this circuit element having an excellent selectivity, when input terminals 33 and 33' receive an electric signal having a resonance frequency of the circuit the mechanical oscillator will be energized through said electric-mechanical converting element into the resonance state to produce an electric output across output terminals 34 and 34' having the same frequency as the input signal.

It is noted that such operation of this oscillator provides a so-called filtering circuit. However, in order to obtain such an electric-mechanical oscillating system, it is necessary to apply a direct magnetic field (a magnet) 35 to the converting element circuit which is shown equivalently in FIG. 3. FIG. 3 is a half block of FIG. 2A. In other words, by controlling the mechanical position of said permanent magnet 35 against the converting element, it is possible to excite the oscillation and vary the characteristics of said element under a contactless condition. This invention does utilize the principle above. Since the oscillator in the absence of magnetic field applied thereto, is not excited into fundamental frequency oscillation by the frequency of the input power signal applied to the input terminals 33 and 33' it is necessary to provide a suitable DC magnetization. Thus, it is necessary to predetermine the magnetic flux of the permanent magnet 35 or the strength of exciting bias such that only when the magnet is applied to the converting portion of said oscillator will it be caused to resonate with a specific frequency. Therefore, when this principle is applied to the remote reading system, the reading operation will be possible only in case of sending an electric input signal from the central office to the oscillator system in the local office and, at the same time, establishing such exciting condition as said magnet being faced to the converting portion in the local office.

FIG. 4 shows a resonance characteristic curve of a circuit in case that the terminals 34, 34' of FIG. 2A is terminated with an impedance of filter design principle and the oscillator element of FIG. 2A is converted into two-terminal network from four-terminal network. That is the resonance characteristic of the oscillator as viewed from input terminals 33, 33'. For this reason, oscillators or read out means 151 through 154 in FIG. 1 do not resonate even when they are excited by currents of frequencies $f_{10}$ through $f_{13}$ unless they are magnetically biased by respective magnets.

In accordance with this invention, the biasing magnets which excite oscillator or read out means 151 through 154 into the resonance state are provided on one side of a digit wheel. FIG. 5 shows an arrangement of permanent magnets designated by dots on one side of the digit wheel. The permanent magnets are positions at cross points between radial lines interconnecting the axis X of the digit wheel and respective display digits and four circles K, L, M, and N concentric with the axis X. Actually, these cross points at which the permanent magnets are to be positioned are determined by binary codes of decimal display digits.

FIG. 6 shows a decimal-binary code conversion table, the codes being the so-called reflection binary codes (Gray codes). A binary digit 1 of the codes represents the presence of the permanent magnet whereas a binary digit 0 the absence of the permanent magnet. Hence, as can be clearly noted from FIG. 5, a decimal 0 does not a magnet on any one of circles K, L, M and N. Positioning of the magnet on circle K represents a decimal 1 and so forth. Above described oscillators or read out means 151 through 154 are positioned on circles K, L, M and N, respectively and are positioned on reading lines (not shown) close to one side surface of the digit wheel. Alternatively, these magnets may be secured to or embedded in the side surface of the digit wheel.

With the above description in mind, the operation of the system shown in FIG. 1 is as follows:

To read at the central office the value displayed by counter 15 installed in a local office oscillators 10 through 13 are set to oscillate at fixed frequencies $f_{10}$ through $f_{13}$, respectively. A movable contact 143 of chopper 14 is switched to stationary contact 141 to apply output frequencies $f_{10}$ through $f_{13}$ to counter 15. Thereafter, movable contact 143 of chopper 14 is switched to stationary contact 142 to supply outputs from read out means 151 through 154 of the counter 15 to filter receivers 16 through 19 in the central office. Suppose now that counter 15 is displaying a decimal digit 0. Under these conditions, as can be noted from FIG. 5, there is no flux of the permanent magnet presenting on a radial line interconnecting the axis X of the digit wheel and the decimal digit 0 so that any one of the read out means 151 through 154 is not crossed by the flux of the permanent magnet. As a result, any one of these oscillators is not excited into resonance at these frequencies $f_{10}$ through $f_{13}$ and hence does not vibrate, thus providing no output. In other words, no input is applied to the filter receivers 16 through 19 via chopper 14. Due to the absence of the output from the filter receivers, the binary-decimal conversion circuit 20 identifies the digit displayed by the counter 15 to be a decimal digit 0 according to the table shown in FIG. 6, thus displaying it on the display device 21. Considering now a case wherein the counter 15 is displaying a decimal digit 6. Again the read out means 151 through 154 simultaneously receive frequencies $f_{10}$ through $f_{13}$. At this time, as can be clearly noted from FIGS. 5 and 6 read out means 152 and 154 are confronting permanent magnets but read out means 151 and 153 do not confront. As a result, only read out means 152 and 154 oscillate to supply oscillation signals $f_{11}$ and $f_{13}$ to filter receivers 16 through 19 via contacts 143 and 142 of the chopper 14. This is equivalent as if oscillators 11 and 13 of the central office were included in oscillators 152 and 154 in counter 15 in the local office. Thus, receivers in the central office read outputs from oscillators apparently included in the local office. These two oscillation signals $f_{11}$ and $f_{13}$ appear on the outputs of respective filter receivers 17 and 19. Accordingly the conversion circuit 20 identifies that the digit displayed by the counter is a digit 6 by two signals having center frequencies at $f_{11}$ and $f_{13}$, respectively and the digit 6 is displayed on the display device 21. Other digits displayed by the counter can be similarly read out.

Figure 7:
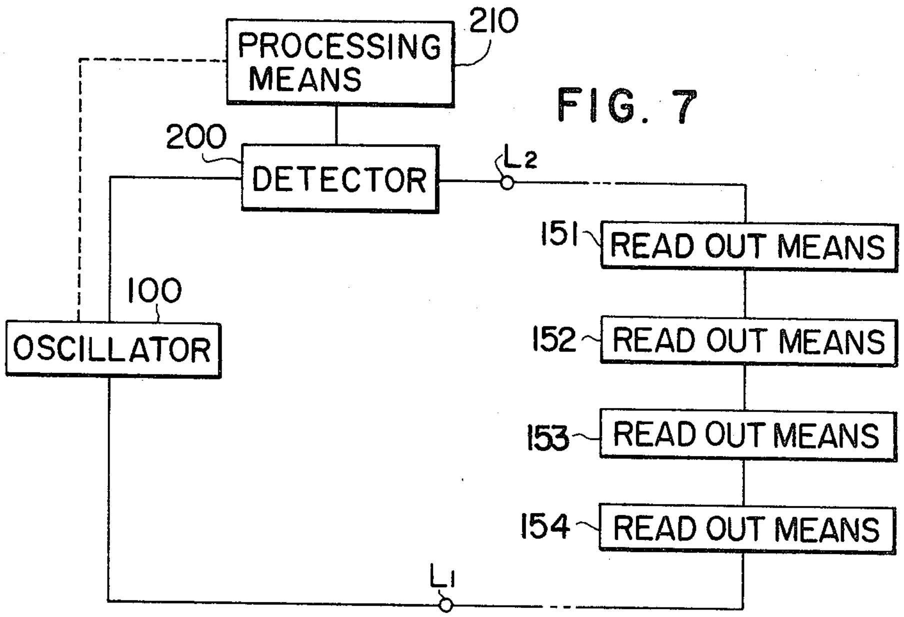
FIGS. 7 and 8 show block diagrams of other modified embodiments of this invention.

FIG. 7 shows a modified embodiment of this invention wherein the magnetostrictive oscillating elements are inserted in series in the two-wire reading line. In accordance with this embodiment, the oscillator 100 installed in the central office is a variable frequency oscillator to which all read out means 151 through 154 in the local office are connected in series, thus utilizing the resonance impedance characteristic of the loop circuits comprising the reading line $L_1 - L_2$ corresponding to different frequencies. Again, the read out means 151 through 154 cooperate with permanent magnets on one side of a digit wheel. In this embodiment, the oscillation frequency of the variable frequency oscillator 100 is varied and the frequency at an instant where the current in the feedback loop of the corresponding frequency of the oscillator 100 reaches an entiresonance is detected by a detector 200 in the central office and the detected information is sent to a processing means 210. The processing means 210 is interlocked with the operation of the oscillator 100 to memorize the oscillation frequency thereof at the time of arrival of the detected signal to compare the stored frequency with oscillation frequencies predetermined by readout means 151 through 154 and cooperating permanent magnets whereby to determines the particular digit displayed by the counter.

Figure 8:
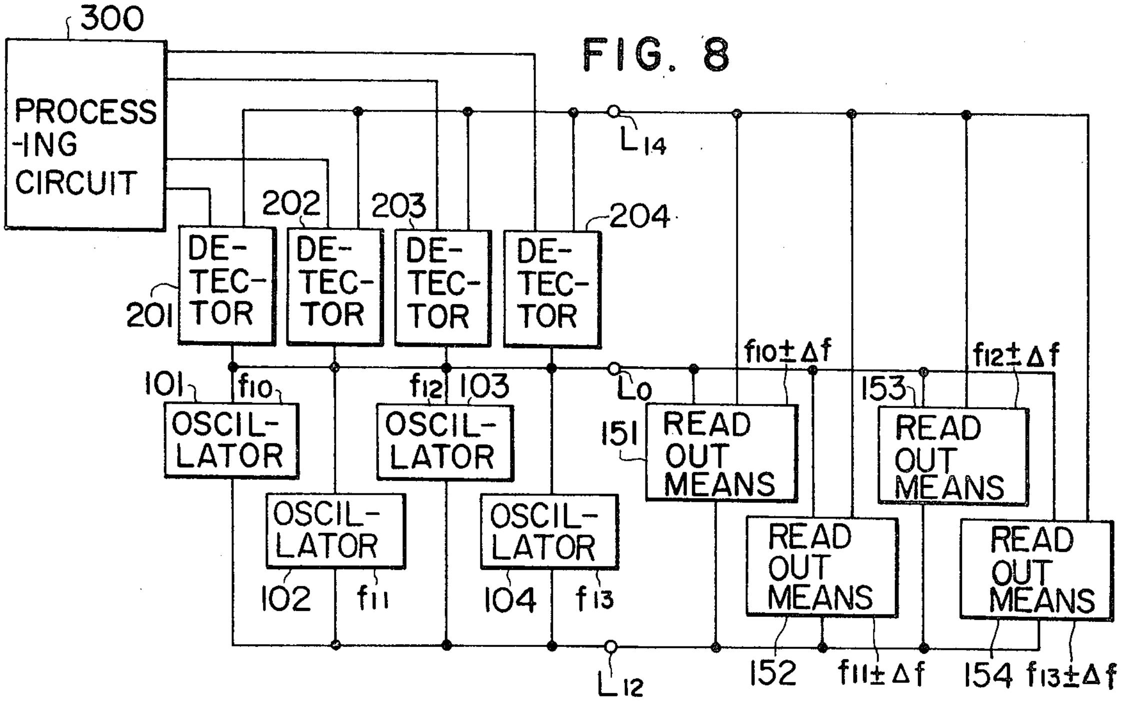

FIG. 8 shows another embodiment wherein so-called four terminal network type filters are used in the four-wire line. This embodiment is identical to that shown in FIG. 7 in that the pass-filtered signal value of the corresponding current in the feedback loop is detected but is different in that oscillators 101 through 104 operate with fixed frequencies. In this embodiment, the read out means are also electric-mechanical filters 151 through 154 which are in the type of four-terminal circuits and are controlled by respective permanent magnets, and reading lines $L_{12}$ and $L_{14}$ compose four-wire line type and in case of using a common line $L_0$, the reading line may be three-wire line type. Detectors 201 through 204 are provided to detect the maximum values of feedback currents that is pass-filtered frequency of the read out means. A converting and processing circuit 300 is provided to convert binary code conditions of these detectors into decimal codes to display the digits displayed by the digit wheel. In both FIGS. 7 and 8, although read out means 151 through 154 are shown as being connected in series and parallel in reading line respectively they can be connected in the other desired connection depending upon the frequency allocation and the construction of the elements or networks.

Although the above described embodiments are constructed such that the read out means resonate to a frequency sent from the central office when the read out means comes to oppose a permanent magnet, this invention is not limited to this particular arrangement. Thus, for example, the read out means may be arranged to resonate to a particular frequency sent from the central office when it is not facing to a magnet so that the read out means becomes dissonate, that is, provides a zero output when the read out means comes to face a permanent magnet.

In the above embodiments, the read out means comprises a tuning read and a magnetostrictive converting element attached thereto. Therefore, it is apparent from the equivalent circuit of said read out means that these embodiments utilize the parallel resonance phenomena positively. However, it is easily understood that so-called read out means may be constructed by such a vibrating element as a tuning reed or tuning fork and a piezo-electric or electrostrictive type converting element attached thereto, said element being in the relation of conjugation with a magnetostrictive element. In this case, it should be noted that the equivalent circuit of this read out means is shown by series resonance circuit constructions. Accordingly, when the read out means is constructed by the vibrating element system utilizing electrostrictive or piezo-electric phenomena, the bias for the converting element can be obtained by electromotive force which is induced in facing the element to the magnetic flux and so the remote reading of the digit counter is also possible.

It is further to be understood that the decimal-digital codes employed in this invention is not limited to the Gray codes shown in FIG. 6 and that any type of decimal codes can be used. It is important that to provide an additional oscillator to perform a parity check to determine whether the read out signal is correct or not by utilizing the frequency of the additional oscillator, or to control the condition of the line or to check the condition of the entire system including local offices. Further, in the forgoing embodiments a chopper has been illustrated to simplify the description it acts as a type of a modulator. The modulation frequency must satisfy the relationship between the modulation frequency and the modulated frequency when modulating read out frequencies $f_{10}-f_{12}$ utilized.

Thus, this invention provides a novel remote reading system wherein the resonance phenomena between magnetic flux of magnets arranged on one side of a digit wheel in accordance with decimal - binary codes and oscillators system in a local office are detected in a central office to remotely read values displayed by a digit wheel. Thus, the local office has no source of power and operates without utilizing any contacting elements. Moreover, as the read out means are constructed by passive elements the novel system operates positively and reliably and can be fabricated at low cost.

What is claimed is:

1. A remote reading system comprising in combination a local office, said local office comprising a digit wheel, a plurality of permanent magnets arranged on one side of said digit wheel to correspond to the digits on said digit wheel to be displayed in accordance with predetermined decimal-binary codes and a plurality of passive electro-mechanical oscillators located closely adjacent said one side of said digit wheel, a predetermined number of said passive oscillators being assigned to one bit of said codes; and a central office, said central office comprising at least one oscillator oscillating at discrete frequencies assigned to said passive oscillators, a plurality of filter receivers responsive to oscillation frequencies of said passive oscillators, a binary-decimal converter for the outputs from said filter receivers, means to display the output from said converter, and a modulator, each one of said passive oscillators operating to resonate to a frequency assigned thereto and sent from said central office when said one passive oscillator comes to face to one of said permanent magnets, said oscillation frequencies being applied from said central office simultaneously to said passive oscillators in said local office through said modulator and said modulator connecting said passive oscillators with said filter receivers whereby to read in said central office the values displayed in said remote local office.

2. The remote reading system according to claim 1 wherein said passive oscillators are set to dissonate to the assigned frequency of said oscillation frequencies from said central office when said passive oscillators come to confront said permanent magnets on one side of said digit wheel and the dissonate states of said passive oscillators are detected by said filter receivers.

3. A remote reading system comprising in combination a local office, said local office comprising a digit wheel, a plurality of permanent magnets arranged on one side of said digit wheel to correspond to the digits on said digit wheel to be displayed in accordance with predetermined decimal - binary codes and a plurality of passive electro-mechanical oscillators located closely adjacent said one side of said digit wheel, a predetermined number of said oscillators being assigned to one bit of said codes; and a central office, said central office comprising a single variable frequency oscillator oscillating at discrete frequencies assigned to respective one of said passive frequencies, a resonance detector and means to connect said passive oscillators to said oscillator in said central office to form loop feedback circuits, each of said passive oscillators operating to resonate to a frequency assigned thereto and sent from said central office when said one passive oscillator comes to face to one of said permanent magnets, said oscillation frequency of said single oscillator being varied successively and said resonance detector successively detecting the resonance states of said loop circuits at said assigned frequencies whereby to read in said central office the values displayed by said digit wheel in said remote local office.

4. A remote reading system comprising in combination a remote local office, said local office comprising a digit wheel, a plurality of permanent magnets arranged on one side of said digit wheel to corresponds to the digits on said digit wheel to be displayed in accordance with predetermined decimal-binary codes and a plurality of electro-mechanical oscillators located closely adjacent said one side of said digit wheel, a predetermined number of said oscillators being assigned to one bit of said codes; and a central office, said central office comprising a plurality of oscillators oscillating at discrete frequencies assigned to respective one of said passive oscillators, means to connect said oscillators in said central office and said passive oscillators in said local office in loop feedback circuits and a plurality of detectors for detecting the pass-filtered frequency of the currents in said loop feedback circuits, each one of said filters operating to resonate to a corresponding frequency of said oscillators in said central office when said one passive oscillator comes to face of said permanent magnets, and said detectors detecting the signal in said feedback loops at the time of resonance whereby to read in said central office the values displayed by said digit wheel in said local office.

5. The remote reading system according to claim 3 wherein said filters are set to dissonate to the assigned frequency when said passive oscillators confront associated permanent magnets and the dissonance states of said loop circuits at said assigned frequencies are sequentially detected by said resonance detector while the oscillation frequency of said oscillator in said central office is varied sequentially.

* * * * *